United States Patent
Riley

(10) Patent No.: US 7,877,647 B2
(45) Date of Patent: Jan. 25, 2011

(54) CORRECTING A TARGET ADDRESS IN PARALLEL WITH DETERMINING WHETHER THE TARGET ADDRESS WAS RECEIVED IN ERROR

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2131 days.

(21) Appl. No.: 10/444,451

(22) Filed: May 23, 2003

(65) Prior Publication Data

US 2004/0237018 A1     Nov. 25, 2004

(51) Int. Cl.
G06F 11/00     (2006.01)

(52) U.S. Cl. .......................... 714/52; 714/800

(58) Field of Classification Search .............. 714/5, 714/52
See application file for complete search history.

(56) References Cited

U.S. PATENT DOCUMENTS

| | | | |
|---|---|---|---|
| 4,112,502 A * | 9/1978 | Scheuneman ................ 714/5 |
| 6,049,894 A * | 4/2000 | Gates ........................ 714/41 |
| 6,175,889 B1 | 1/2001 | Olarig | |
| 6,223,299 B1 * | 4/2001 | Bossen et al. ................ 714/5 |
| 6,272,651 B1 * | 8/2001 | Chin et al. ................. 714/43 |
| 6,425,024 B1 | 7/2002 | Kelley et al. | |
| 6,483,354 B1 | 11/2002 | Gasparik | |
| 6,766,479 B2 * | 7/2004 | Edwards, Jr. .................. 714/43 |
| 6,904,546 B2 * | 6/2005 | Wu et al. ....................... 714/44 |
| 6,915,446 B2 * | 7/2005 | Riley ............................. 714/5 |
| 6,996,750 B2 * | 2/2006 | Tetreault ....................... 714/44 |
| 2002/0002651 A1 * | 1/2002 | MacLaren et al. .......... 711/102 |
| 2002/0013929 A1 * | 1/2002 | Maciver ..................... 714/800 |
| 2002/0057106 A1 | 5/2002 | Koo | |
| 2002/0083256 A1 | 6/2002 | Pannell | |
| 2002/0083257 A1 | 6/2002 | Shah | |
| 2002/0108004 A1 | 8/2002 | Shah | |
| 2002/0120805 A1 | 8/2002 | Hensley et al. | |
| 2002/0144039 A1 | 10/2002 | Lackey, Jr. et al. | |
| 2002/0188788 A1 | 12/2002 | Addy | |
| 2003/0065842 A1 | 4/2003 | Riley et al. | |
| 2003/0070111 A1 | 4/2003 | Riley | |

OTHER PUBLICATIONS

"LogiCORE PCI-X Interface v5.0," DS 208 Mar. 7, 2003 Product Specification (7 p.).

* cited by examiner

Primary Examiner—Sam Rizk

(57) ABSTRACT

As disclosed herein, an interface for a device adapted to couple to an interconnect may comprise decode and error check logic and a plurality of decode logic units. The decode and error check logic may receive error check bits and a target address from the interconnect and may determine whether the target address was received in error. At least one of the decode logic units also may receive the error check bits and correct the target address using the error check bits in parallel with the decode and error check logic determining whether the target address was received in error.

16 Claims, 1 Drawing Sheet

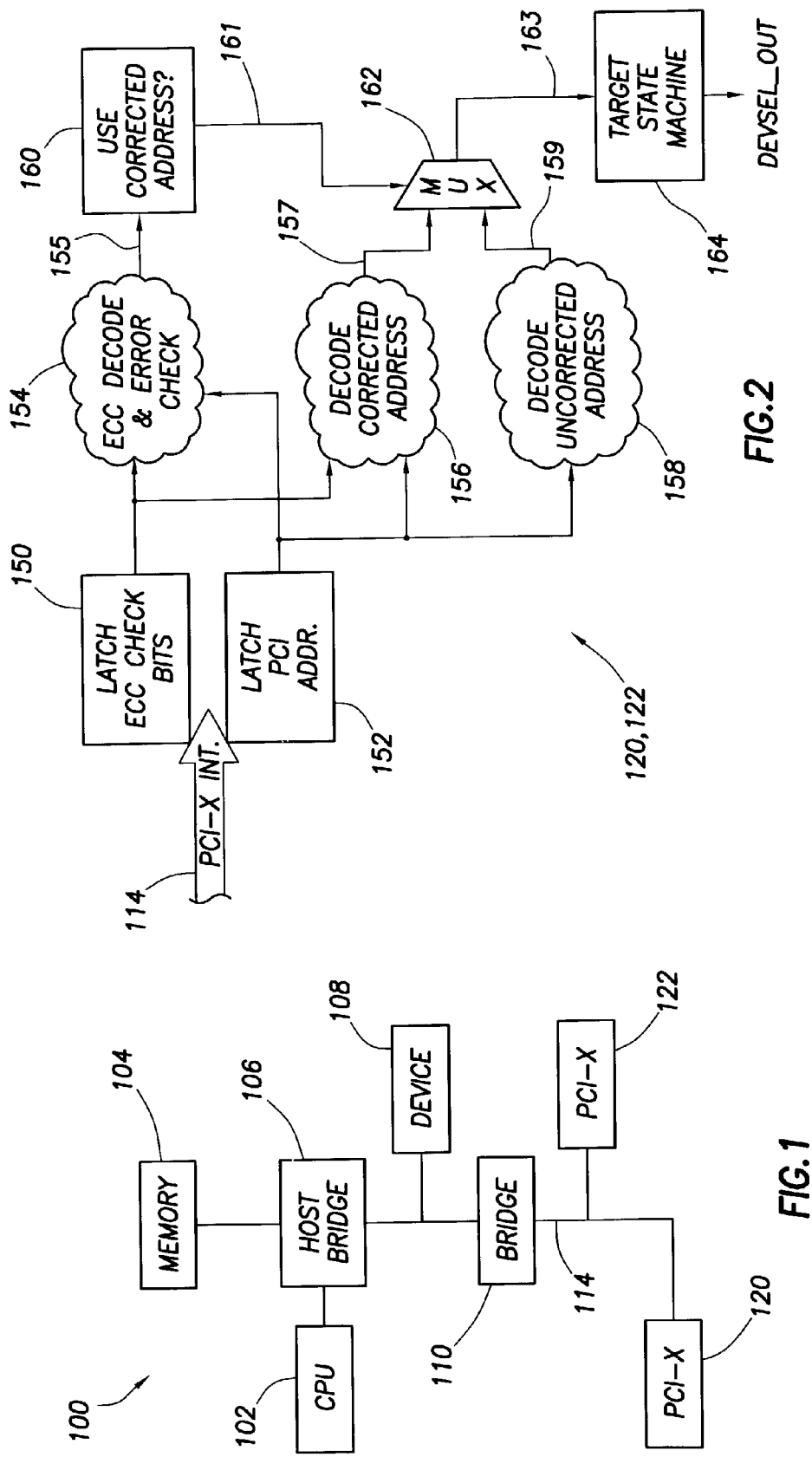

CORRECTING A TARGET ADDRESS IN PARALLEL WITH DETERMINING WHETHER THE TARGET ADDRESS WAS RECEIVED IN ERROR

BACKGROUND

In accordance with various bus protocols, a transaction may be provided from an initiator device to at least one of various target devices on a bus or interconnect. Such protocols may include peripheral component interconnect ("PCI") or PCI-X. Each device may decode the transaction to determine if the transaction is intended for that or another device. If the transaction is intended for that device, the device may claim and process the transaction. If the transaction is not intended for that device, the device does not claim the cycle. Instead, another device may successfully decode and claim the transaction.

The PCI-X protocol specifies that the decode process take less than a specified amount of time. That decode timing may be varied as desired and, in general, is specified as "A," "B," "C," or "subtractive" decoding in accordance with the PCI-X protocol. The A decoding is the fastest, while B, C and subtractive decoding permit increasingly more time in accordance with the PCI-X protocol.

PCI-X may permit error correction code ("ECC") bits to be included with a transaction. The ECC bits may permit the target device to determine if the transaction (e.g., the address phase of the transaction) is received with or without errors. Errors (e.g., a "1" being received as a "0", or vice versa) may be caused by any one of a variety of reasons, as would be well known. Furthermore, the ECC bits may permit the target device to correct a portion of a transaction in many instances. Thus, ECC bits permit error detection and correction. Error detection, error correction (in the event one or more bit errors are present), and address decoding all must be performed within the decode time specified by the relevant protocol. The inclusion of the ECC error detection and correction capability into the PCI-X protocol has created a situation in which decoding a transaction quickly enough has become problematic.

BRIEF SUMMARY

In some embodiments, an interface for a device adapted to couple to an interconnect may comprise decode and error check logic and a plurality of decode logic units. The decode and error check logic may receive error check bits and a target address from the interconnect and may determine whether the target address was received in error. At least one of the decode logic units also may receive the error check bits and correct the target address using the error check bits in parallel with the decode and error check logic determining whether the target address was received in error.

BRIEF DESCRIPTION OF THE DRAWINGS

For a detailed description of the embodiments of the invention, reference will now be made to the accompanying drawings in which:

FIG. 1 shows an electronic system in accordance with various embodiments of the invention; and FIG. 2 shows a block diagram of a PCI-X compliant device implementing dual, parallel decode scheme in accordance with various embodiments of the invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to FIG. 1, an electronic system 100 is shown in accordance with various embodiments of the invention. The electronic system 100 may be representative of a computer, but also may be representative of numerous other types of electronic systems. As shown, system 100 may include a central processor unit ("CPU") 102, memory 104, bridges 106 and 110, and devices 108, 120, and 122. Various of the components shown in FIG. 1 may be coupled together and may be in communication with each other via the host bridge 106 and bridge 110. For example, the CPU 102 may perform read and/or write cycles to memory 104, which preferably comprises volatile memory such as random access memory ("RAM"). Device 108 may be any type of device such as an input device (e.g., mouse, keyboard), an output device (e, g., display), a network interface controller ("NIC"), a read only memory ("ROM").

Devices 120 and 122 may be compliant with the peripheral component interconnect ("PCI") protocol or the PCI-X protocol. Although two PCI-X compliant devices 120, 122 are shown in FIG. 1, any number (i.e., one or more) may be included as desired. The interconnect 114 between the bridge 110 and PCI-X devices 120, 122 may be provided in accordance with the PCI-X protocol. PCI-X devices 120 may be any desired type of devices such as memory, NICs, modems.

FIG. 2 shows an exemplary embodiment of either of the PCI-X devices 120 and 122. As shown, the device may include latch ECC check bit logic 150, latch PCI address logic 152, ECC decode and error check logic 154, address decoders 156 and 158, logic 160 that determines whether or not the corrected address is to be used for the current transaction, a multiplexer 162, and a target device state machine 164. Other configurations besides that shown are also possible. The components shown in FIG. 2 generally comprise the "front end" of the device, that is, the logic that latches and decodes the transaction address to determine if the transaction targets that device 120, 122. If the transaction targets the device, the logic shown in FIG. 2 also claims the transaction. Other components and logic (not specifically shown), such as a CPU, memory, may process the transaction and perform one or more functions in accordance with the requirements specified in the transaction. For example, the transaction may comprise a memory write to which the device 120, 122 may respond by writing data included in the transaction to memory (not specifically shown) internal to, or otherwise accessible by, the device 120, 122.

The transactions received over the PCI-X interconnect 114 may include one or more data phases, one or more target address phases, ECC check bits for protection, and other types of information. The latch ECC check bit logic 150 may latch the ECC bits from the transaction, while the latch PCI address logic 152 may latch the target address from the transaction. The ECC decode and error check logic 154 may generate ECC bits based on the target address in the transaction, compare such ECC bits to the ECC bits provided in the transaction via latch 150. If the two sets of ECC bits match, then the address phase(s) of the transaction was received error-free. If, however, the two sets of ECC bits do not match, then one or more errors has occurred in the address. If an error has occurred, the address may be corrected by decode logic 156. Decode logic 158 is used to decode the uncorrected address. Thus, decode logic 156 decodes corrected addresses, while decode logic 158 decodes uncorrected addresses. Moreover, ECC decode and error check logic 154 determines whether the target address has been received in error or not and decoders 156 and 158 decode the corrected an uncorrected versions of the target address.

In accordance with various embodiments of the invention, the process of detecting errors with the target address may occur simultaneously or concurrently (i.e., in parallel) with the process of correcting the address. In other words, rather than waiting for a determination as to whether the address has an error, decode logic 156 begins to correct and decode the address. If ECC decode and error check logic 154 determines that the address, in fact, did have a correctable error, decode logic 156 advantageously will have already begun the error correction process or may even have completed the error correction process by the time logic 154 detects an error. If, on the other hand, ECC decode and error check logic 154 determines that the address is error-free, then decode logic 158 supplies the correctly decoded address. In this latter situation (error free reception of the address), the process of correcting the address in logic 156 may be unnecessary, but has not wasted any time. Thus, devices 120, 122 may include a dual decode scheme in which the address error checking occurs in parallel with actually correcting the address.

Referring still to FIG. 2, the output signal 157 from decode logic 156 may be asserted if the decode logic 156 corrects and decodes the address and determines that the decoded corrected address corresponds to the device 120 in which the logic shown in FIG. 2 resides. Similarly, the output signal 159 from decode logic 158 may be asserted if the decode logic 158 decodes the original address from the interconnect 114 (i.e., the uncorrected address from latch 152) and determines that the decoded address corresponds to the device 120. Both decode signals 157, 159 may be provided to multiplexer 162. ECC decode and error check logic 154 provides a signal 155 to logic 160 that indicates whether the address was received with or without an error. The logic 160 responds to signal 155 by asserting a control signal 161 to multiplexer 162 based on whether an address error was detected by logic 154. The control signal 161 may cause the multiplexer to select either of the decode signals 157, 159 from address decoders 156 and 158, respectively. As such, if no error is detected, logic 160 asserts control signal 161 so as to cause the multiplexer 162 to select signal 159 to be provided through the multiplexer to the target state machine 164. In this state (i.e., multiplexer 162 controlled so as to select decode signal 159), if the transaction is targeting the device 120, 122, decode signal 159 may be asserted and, via the multiplexer 162, multiplexer output signal 163 will be asserted as well.

If ECC decode and error check logic 154 detects an error with the address phase(s) of the transaction, logic 154 asserts signal 155 to indicate this condition and logic 160 may respond to signal 155 by asserting control signal 161 to a corresponding state (e.g., the opposite logic level from the level indicating an error-free address reception). In this condition (i.e., an error has occurred with the address), control signal 161 may cause multiplexer 162 to provide the decode signal 157 as an output signal 163. If the transaction is targeting the device 120, 122, decode signal 157 may be asserted and, via the multiplexer 162, multiplexer output signal 163 will be asserted as well.

In either case (address targeting the device 120, 122 with or without an error), the target state machine 164 may control the PCI-X interface for the device 120,122 as is well-known. The target state machine 164 claims the transaction by asserting the DEVSEL_OUT signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An interface for a device adapted to couple to an interconnect, comprising:

decode and error check logic that receives error check bits and a target address from said interconnect and determines whether the target address was received in error; and a plurality of decode logic units that each receive the target address;

wherein at least one of said decode logic units also receives the error check bits and corrects the target address using the error check bits in parallel with the decode and error check logic determining whether the target address was received in error.

2. The interface of claim 1 further comprising a multiplexer controlled by logic coupled to said decode and error check logic that asserts a control signal to the multiplexer, wherein the multiplexer includes a plurality of inputs that are output signals from the plurality of decode logic units.

3. The interface of claim 1 wherein the at least one decode logic unit begins to correct the address before being informed whether the address is actually in error.

4. The interface of claim 1 wherein the at least one decode logic unit is informed that the address is in error after the at least one decode logic unit has completed correcting the address.

5. The interface of claim 1 wherein the plurality of decode logic units comprise two decode logic unit, one decode logic being the at least one decode logic that corrects the target address in parallel with the decode and error check logic determining whether the target address was received in error, and the other decode logic unit decodes the target address without correcting said target address.

6. The interface of claim 1 wherein the interconnect is PCI-X compliant.

7. An electronic system, comprising:
a CPU;
a bridge coupled to said CPU; and
a device coupled to said bridge, said device receiving transactions having a target address, said device further comprising:
   decode and error check logic that receives error check bits and a target address from said interconnect and determines whether the target address was received in error; and
   a plurality of decode logic units that each receive the target address;
   wherein at least one of said decode logic units also receives the error check bits and corrects the target address using the error check bits concurrently with the decode and error check logic determining whether the target address was received in error.

8. The system of claim 7 wherein the device further comprises selection logic controlled by logic coupled to said decode and error check logic that asserts a control signal to the selection logic, wherein the selection logic includes a plurality of input signals that are output signals received from the plurality of decode logic units.

9. The system of claim 7 wherein the at least one decode logic unit begins to correct the address before the decode and error check logic determines whether the address is in error.

10. The system of claim 7 wherein the at least one decode logic unit is alerted that the address is in error after the at least one decode logic unit completes correcting the address.

11. The system of claim 7 wherein the plurality of decode logic units comprise two decode logic units, one decode logic being the at least one decode logic that corrects the target address concurrently with the decode and error check logic determining whether the target address was received in error, and the other decode logic unit decodes the target address without correcting said target address.

12. An interface for a PCI-X compliant interconnect device, comprising:
   decode and error check logic that receives error check bits and a target address from an interconnect and determines whether the target address was receive in error; and
   a means for decoding the target address concurrently with said decode and error check logic determining whether the target address was received in error.

13. The interface of claim 12 wherein the means includes a means for beginning to correct the address before being informed whether the address is actually in error.

14. The interface of claim 12 wherein the means includes a means for completing correcting the address before being informed that the address is in error.

15. A method of determining whether a transaction comprising a target address and error check bits targets a device, comprising:
   determining whether the target address has an error;
   while determining whether the target address has an error, correcting the target address to produce a corrected address and decoding said corrected address; and
   while determining whether the target address has an error and correcting the target address, decoding said target address without correcting said target address.

16. The method of claim 15 further including asserting a signal indicating that the target address has an error, and correcting the target address completes before said signal is asserted.

* * * * *